April 30, 1940.  L. W. CAREY  2,198,602
MINIATURE CAMERA
Filed Jan. 29, 1938  4 Sheets-Sheet 1
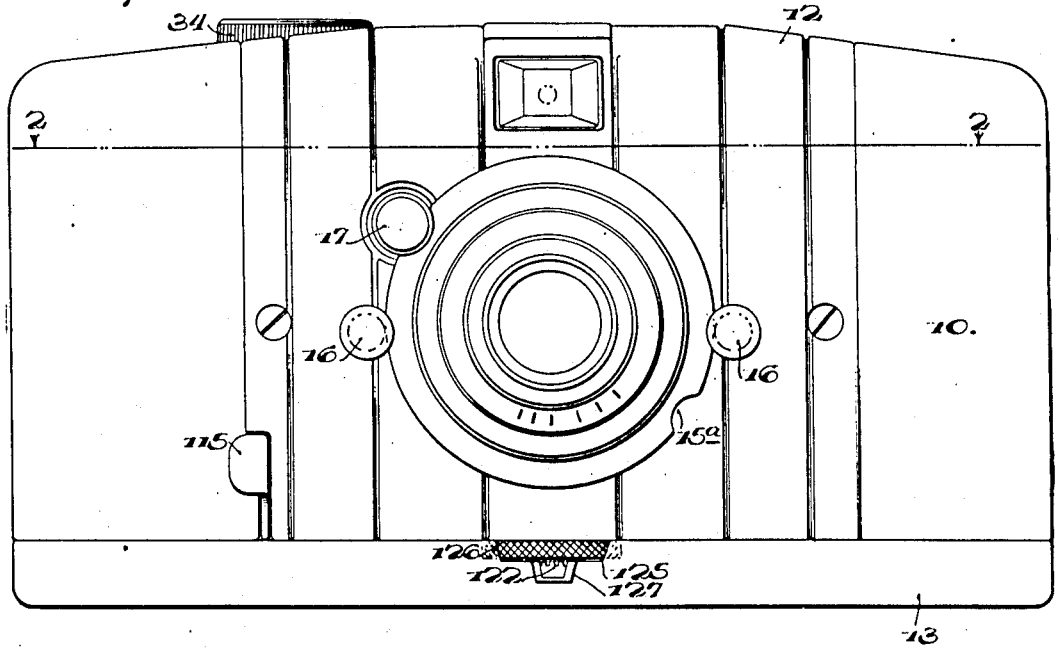
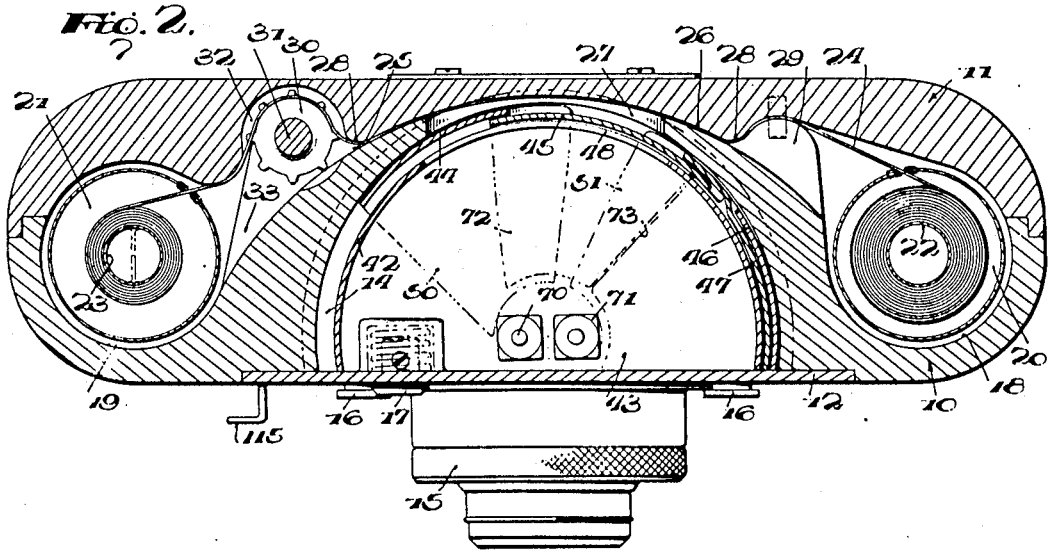
Inventor
L. W. Carey.
Attorney Inventor
L. W. Carey.
Attorney

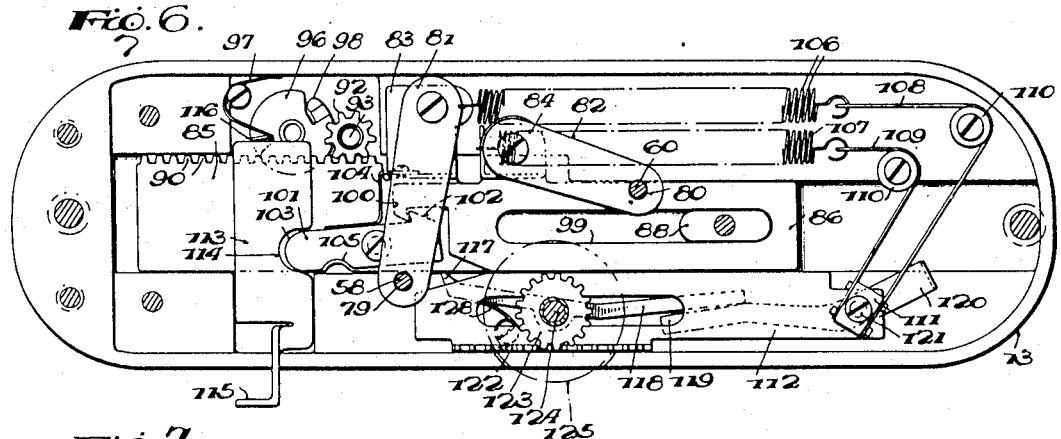
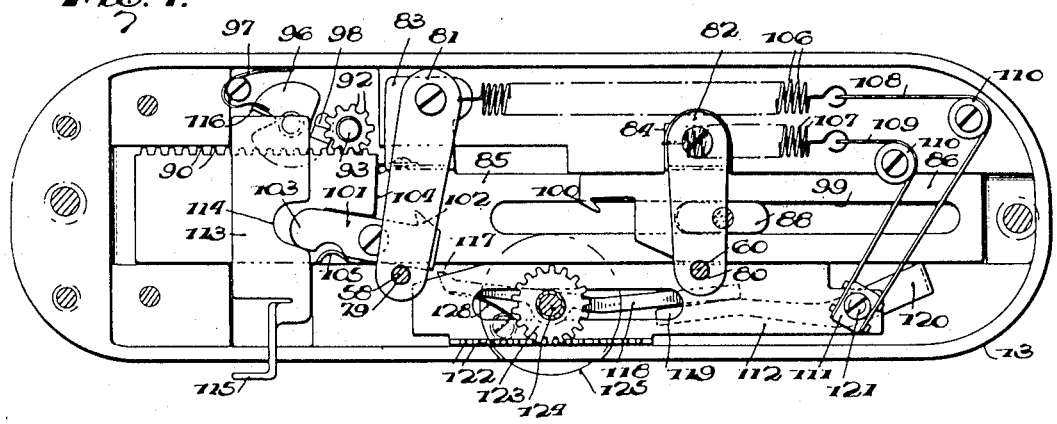
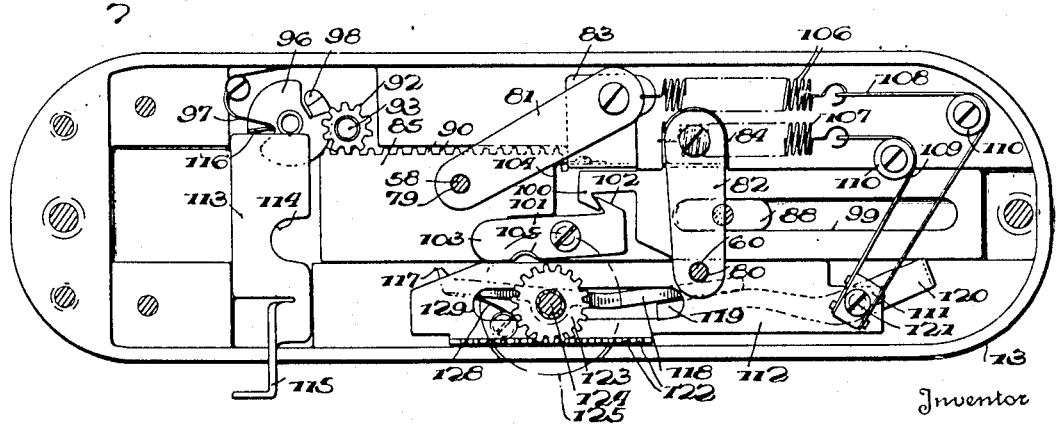

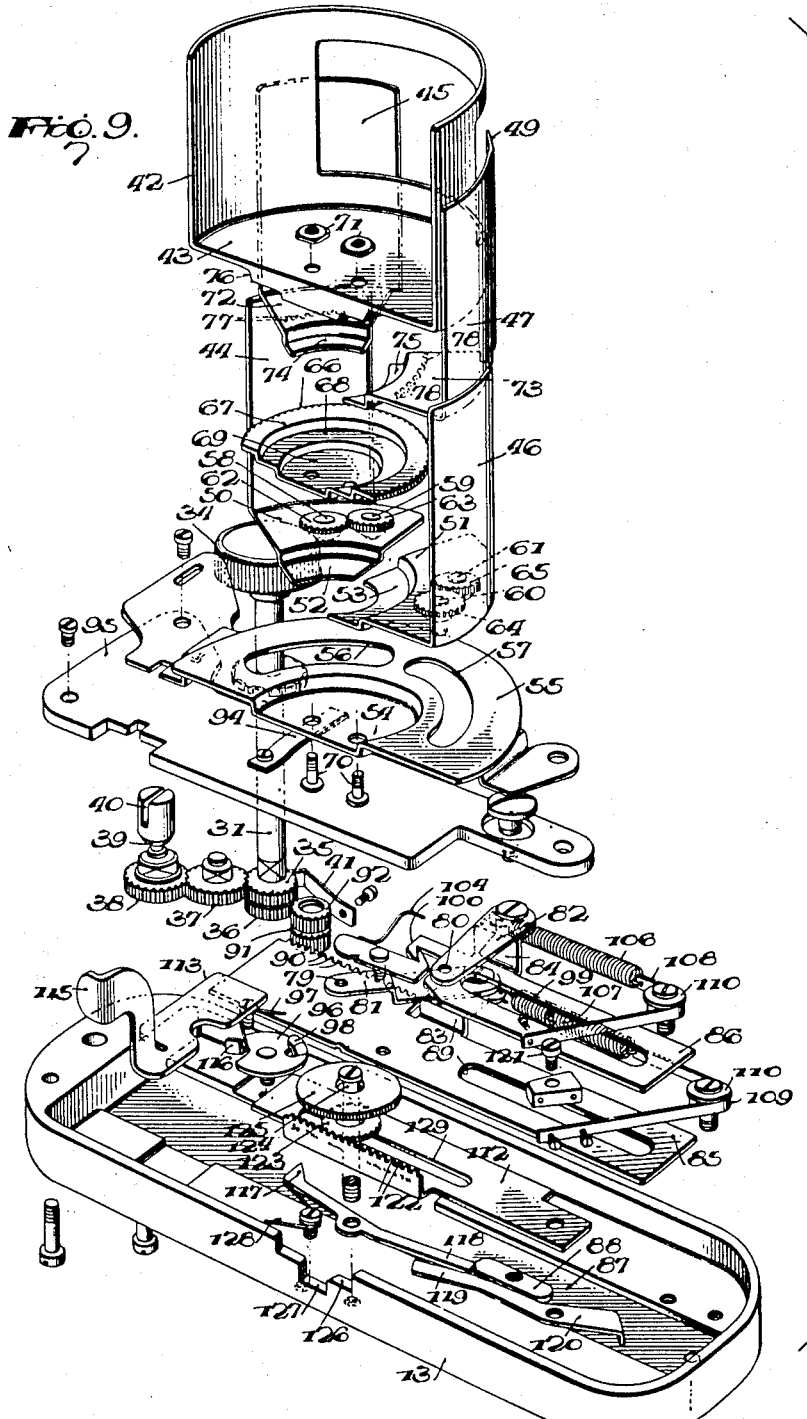

Patented Apr. 30, 1940

2,198,602

UNITED STATES PATENT OFFICE 2,198,602

MINIATURE CAMERA

Lawrence W. Carey, Dexter, Mich., assignor to Precision Instruments, Inc., Ann Arbor, Mich., a corporation of Michigan Application January 29, 1938, Serial No. 187,738

14 Claims. (Cl. 95—58)

The present invention relates generally to photography and more particularly to what are commonly known as miniature or candid cameras wherein on account of the relatively small films or light sensitive surfaces to be exposed in the taking of pictures, it is especially desirable that such surfaces be not only maintained flatly or evenly in the focal plane, but that the light rays impinging thereupon during exposure be controllably distributed evenly over every portion of the area of such surfaces.

In consideration thereof, it is an object of the present invention to provide a camera of the above type having means to counteract the normal tendency of film to curve or curl laterally between the feed and take-up spools on account of the tension exerted on the film base by its coating of sensitized material, and to so counteract this tendency that the film will present itself flatwise and evenly across the exposure opening.

It is a further object to do this without close confinement of the film such as would impede its free feeding movements and also without tendency toward undue scraping of its sensitized surface at opposite sides of the opening.

Another object of the invention is the provision of a focal plane shutter which, in its normal closed position, affords a fully effective closure for the exposure opening and which, in its operative movement, provides for the even uniform distribution of light to every portion of the sensitized surface opposite the exposure opening.

A still further object is the provision of a focal plane shutter of metal or like rigid construction capable of ready manufacture and easily assembled, and permitting readily controllable time, bulb, and instantaneous exposures to be made.

A still further object is the provision of a focal plane shutter together with a separate positive shutter actuating mechanism which will counteract any tendency toward undesirable shutter acceleration and which embodies a single adjustment for simultaneously varying the speed of shutter mechanism and the width of the aperture presented by the shutter as it crosses the exposure opening.

With the above general objects in mind, further and more specific objects of the invention, together with the details of construction, arrangement and operation of the various parts and their resulting advantages, will more clearly appear in the course of the following description of the best mode so far devised for carrying the invention into practical effect, reference being made to the accompanying drawings, forming a part of the specification, and in which Figure 1 is a front elevation of the camera forming the basis of this invention.

Figure 2 is a horizontal sectional view taken therethrough substantially on the line 2—2 of Figure 1.

Figure 3:
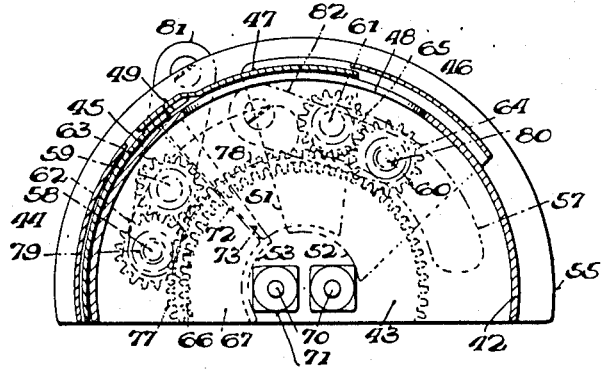
Figures 3, 4 and 5 are detail horizontal sections through the shutter and its support, Figure 3 showing the shutter closed, Figure 4 showing the shutter during an exposure after one section has moved and before movement of the other section has started, and Figure 5 showing the position of the shutter after an exposure has been completed.

Figures 6, 7 and 8 are detail sectional top plan views of the shutter operating mechanism in general, showing the parts in positions respectively corresponding to the positions of the shutter as illustrated in Figures 3, 4 and 5, and

Figure 9 is a view in perspective of the shutter and its operating mechanism, showing the various parts in detached or exploded relation.

Referring now to the drawings and particularly to Figures 1 and 2 thereof, the casing of the improved camera is preferably made up of front and rear interfitting and correlated sections 10 and 11, together with a front plate 12 and an upwardly opening hollow base section 13, upon the upper edge of which the sections 10 and 11 and the front plate 12 seat.

The front section 10 is formed with a centrally located substantially semi-cylindrical and vertically disposed shutter chamber 14, opening through the front face of the section and closed at its top, the bottom of this chamber opening into the hollow base 13.

The open front of the shutter chamber 14 is closed by the front plate 12 carrying the lens and lens holder 15 detachably in position beneath opposing studs 16 under control of a spring-actuated locking button 17. The front plate 12 is preferably set in to the forward surface of the front section 10 of the casing, and the locking button 17 normally occupies one of the diametrically opposed peripheral recesses 15a of the lens holder so as to prevent its rotation to a point where these recesses, coinciding with the studs 16, permit of removal of the lens and lens holder for purposes of repair or substitution.

The front section 10 of the casing is provided in its rear surface, in cooperation with recessed portions of the front surface of the rear section 11, with vertically disposed side recessed portions 18 and 19, to thus form with the rear section a film feed chamber 20 and a film take-up chamber 21, so that by removal of the rear section 11 feed and take-up spools 22 and 23 may be disposed in these chambers so as to provide for movement of the film 24 from the former to the latter.

In furtherance of the above, the rear face of the front section 10 of the casing also presents, between its side recessed portions 18 and 19, a convexly curved surface 25 which, in cooperation with a concavely curved intermediate portion of the front surface of the rear section 11, forms a film feed channel or throat. Centrally of this film feed channel or throat the feed section 10 of the casing has an exposure opening 27 communicating with the shutter chamber 14 so that rays of light from the latter, under control of the shutter to be presently described, may impinge upon that section of the film at the rear of the exposure opening 27.

It is a well-known fact that sensitized film ordinarily tends to curve, curl, or buckle transversely when off of the roll, due to the tension exerted on the film base by its coating of sensitized material and, while this might be counteracted by a film feed channel or throat so narrow as to guide the film firmly in flatwise relation, this would not only seriously impede free feeding movements of the film but would also tend to cause undesirable scraping of the sensitized surface of the film against the adjacent wall of the feed throat.

The present invention proposes to counteract the foregoing tendency of the film to curl or curve, and without the above-mentioned disadvantages, by providing the forward surface of the rear section 11 of the casing with rounded vertical ribs 28 at opposite sides of its intermediate concavely curved portion and thus at opposite ends of the film feed channel or throat, and to thereby cause a more or less abrupt flexing of those portions of the film 24 at opposite ends of the feed throat in a direction opposite to the curvature of the film in its passage through the curved feed throat. In so doing, the tendency of the film to curve or curl is counteracted without endangering undesirable scraping of the sensitized surface thereof, since the opposite surface contacts the ribs 28.

At one side or end of the feed throat the upper and lower edges of the film are guided by rounded projections 29 of the front section 10 of the casing, while at the opposite side or end of the feed throat the upper and lower apertured edges of the film are engaged by the toothed members 30 of a film advancing shaft 31 which extends within a recessed portion 32 of the front surface of the rear section 11 and which is journaled in portions 33 of the front section and the top of the latter section above which the shaft has a knurled film advancing roller 34.

It is obvious then that since the film supporting and actuating parts are carried by the front section 10 of the casing, removal of the rear section 11 may be easily and quickly effected in the changing or replenishing of the film.

Referring now to Figure 9 of the drawings, it will be noted that shaft 31 is provided at the lower end thereof, below casing section 10, with a pair of gears 35 and 36. These gears are of the same size and have aligned teeth, and the upper gear 35 is in constant driving relation, through an intermediate pinion 37, with a gear 38 at the lower end of a stub shaft 39. The stub shaft 39 is journaled through the center of the base of the film take-up chamber, and its portion which upstands into said chamber is slotted as at 40 to be engaged in driving relation by a cross portion of the film take-up spool 23.

Thus rotation of the shaft 31 in one direction by its upper knurled roller 34 will cause rotation of the spool 23 to take up the film 24, or, in other words, advance said film the distance of one exposure space thereof, so as to align an unexposed portion of its surface opposite the film exposure opening 27.

Every such film advancing movement of shaft 31 is utilized to set the shutter for an exposure operation, or in other words position the same for release in the next picture taking operation, as will be presently described. Rotation of the shaft 31 in the opposite direction is prevented at all times by a spring dog 41 engaging its above-mentioned gear 35.

Within the shutter chamber 14 of the camera casing, a stationary substantially semi-cylindrical shield 42 upstands from a substantially semi-circular base plate 43, whose curvature is concentric with that of the wall of said chamber. This shield is spaced from the wall of the chamber 14 to form therebetween a sufficient space for the accommodation of the focal plane shutter of the present invention, which shutter is in two sections, each section comprising a pair of horizontally overlapping, differentially movable, curved upright wings. The wings 44 and 45 constitute one section of the complete shutter and, in their simultaneous effective movements, the inner wing 45 moves at a proportionately greater speed and to a proportionately greater distance than the outer wing 44. The wings 46 and 47 constitute the other section of the shutter and, in the effective movements thereof, the inner wing 47 moves at proportionately greater speed and to a proportionately greater extent than the outer wing 46. It should be understood at this point that during each exposure or picture taking operation, each section of the shutter moves as a unit, so that, by controlling the time interval between movements of the two sections or units, the width of the space between the same, through which exposure is made, may be easily and accurately controlled.

Exposure is made through an opening 48 of the shield 42 which is opposite to the exposure opening 27 of the casing and, at the start of an exposure operation, the shutter wings 44 and 45 constituting one section of the shutter are in full overlapped position beyond one side of said opening 48. In this position of the parts, the opening 48 is entirely covered by the overlapping wings 46 and 47 of the other section of the shutter which are then in spread overlapping position spanning the full opening 48, it being noted that one side of wing 47 is slightly offset as at 49 to overlap the adjacent edge of the wing 45 of the other section, so as to effectively prevent reflection of light around this side of the aperture covering sections 46 and 47.

As best seen in Figure 9 also, the shutter wings 44 and 46 are the outer wings and upstand from arcuate base plates 50 and 51 whose inner portions 52 and 53 are depressed or downwardly offset to seat within the central substantially semi-circular depression 54 of a lower guide plate 55 of general semi-circular form. The base plates 50 and 51 of the shutter wings 44 and 46 rest flatwise on this guide plate 55 and the latter is provided with arcuate slotted openings 56 and 57 to accommodate the lower ends of parallel shafts 58 and 59 of the wing base 50 and shafts 60 and 61 of the wing base 51. Secured to the upper ends of these shafts respectively are gears 62, 63, 64 and 65.

The gears 62 and 63 of wing base 60 are in mesh with one another, though gear 63 and its shaft 59 are set nearer to the outer perimeter of base 50 than gear 62 and its shaft 58. The same relation exists between gear 64 with its shaft 60 and gear 65 with its shaft 61 of the wing base 51, the relation of the gears, as above, permitting the two gears 62 and 64 to engage the toothed edge 66 of a stationary plate 67. This plate 67 has its teeth 66 formed along the outer edge of an upper outer portion thereof, within which it has an intermediate depressed portion 68 adapted to movably confine the depressed portions 52 and 53 of the wing bases 50 and 51 and form with a wall of the depression 54 of guide plate 55 a guide chamber in which said wing base depressions are shiftable. The toothed plate 67 also has a central portion 69 depressed below its intermediate portion 68 adapted to seat against the base of the guide plate depression 54 inwardly beyond the inner edges of the wing base depressions 52 and 53, in order that it may be securely and stationarily connected to the guide plate 55 by bolts 70 which upstand through said guide plate, the toothed plate 67 and the shield base 43, to receive nuts 71 rigidly connecting these parts.

The shutter wings 45 and 47 likewise upstand from arcuate bottom plates 72 and 73 having inner depressed portions 74 and 75 seated on the intermediate depressed portion 68 of the toothed plate 67 and movably confined between the latter and the upper outer shoulder 76 of a substantially semi-circular enlargement upon the lower surface of the shield base 43. The wing bases 72 and 73 have upon their lower surfaces toothed segments 77 and 78 which are thus immediately above and outwardly beyond the toothed edge 66 of the toothed plate 67, so that these segments will engage the gears 63 and 65 of the wing bases 50 and 51, said gears 63 and 65 upstanding above the gears 62 and 64 engaging said toothed edge 66.

The shafts 58 and 60 of the two innermost gears 62 and 64 depend substantially below the guide plate 55 through its arcuate slots 56 and 57 and project into apertures 79 and 80 at the free inner ends of a pair of shutter actuating arms 81 and 82 pivotally connected at their opposite ends to brackets 83 and 84 upstanding and offset from lower and upper shutter actuating slide plates 85 and 86.

Referring now to the hollow base 13 of the casing, as best seen in Figure 9, it is provided within its lower portion with a longitudinal channel indicated at 87 in which the bottom slide plate 85 is shiftable in the direction of its length, and in which it is guided not only by virtue of the side walls of the channel but by a stationary guide piece 88 which rises in the channel through a lengthwise slot 89 of the slide. One end of the channel is enlarged and the corresponding end of the slide is also widened and its respective end provided with teeth 90 forming a rack which is normally in engagement with the lower gear 91 of a pair of similar rigid gears, the upper gear 92 of which normally engages the lower gear 36 of the vertical actuating shaft 31. The pair of gears 91, 92 just mentioned are loosely disposed on a post 93, as seen in Figures 6, 7 and 8, and are normally engaged and pressed downwardly by a spring 94 shown in Figure 9 and supported by a bedplate 95 which, in the assembled position, seats above the two slide plates 85 and 86.

The double gear 91 and 92 overlies a rotatable disk 96 normally controlled by a spring 97 and having a peripheral portion thereof upset to form a gear lifting tongue 98, so that, when the disk 96 is partially rotated to bring the tongue 98 beneath the double gear 91, 92, the latter will be shifted vertically to disengage its lower gear 91 from the rack 90 of slide 85.

The slide 86 is shiftable lengthwise on the slide 85 and the guide block 88 upstands through a longitudinal slot 99 of said slide 86, one end of the latter of which is provided with a rigid hook 100.

On the slide 85 nearest the inner or hook end of slide 86 is an intermediately pivoted trigger 101 having at its inner end a hook 102 and having at its opposite end a rounded nose 103. This trigger is controlled by a spring 104 normally holding the trigger against a stop 105 to position the trigger for engagement with the hook end 100 of slide 86, and thus when both slides are shifted to the right in Figures 6, 7 and 8, trigger 101 will engage the hook end 100 of slide 86 and the two slides thus joined for simultaneous shifting movement toward the left.

Both slides are at all times urged toward the right in the above figures by springs 106 and 107, the former engaging the bracket 84 of slide 86 and the latter engaging the bracket 83 of slide 85. The opposite ends of these springs are connected to flexible straps 108 and 109 extending around rollers 110 and secured to a head block 111 pivotally connected to one end of an adjusting frame 112 which will be more particularly referred to hereinafter.

Above the ratchet end of slide 85 and having a sliding movement in the frame base 13 transversely with respect to the movement of said slide 85 is an inwardly and outwardly shiftable releasing member 113 having a recess 114 at one side and having at one end thereof a finger piece 115 which projects exteriorly and forward of the camera casing through a slotted portion of the front plate 12 as shown in Figure 1. In its normal inactive position as shown in Figures 6 and 8, this release abuts at its inner end an upstanding shoulder 116 of the rotatable disk 96, and these are the relative positions the parts assume after an exposure has been made, the various parts of the actuating mechanism being then as in Figure 8 and the shutter being in the position shown in Figure 5, with both sections thereof shifted clockwise and the wings 44 and 45 overlying and closing the shield opening to thus prevent passage of light rays through the exposure aperture 27.

Figure 5:
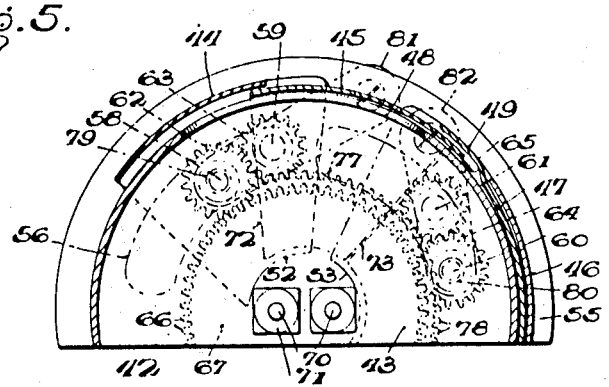

Thus, starting from the position of the parts shown in Figures 5 and 8, the operator, grasping the knurled roller 34 rotates shaft 31 in a counterclockwise direction to shift the film for positioning an unexposed portion thereof opposite the exposure aperture 27. In so doing, the double gear 91, 92 is rotated and gear 91, engaging rack 90 of slide 85, shifts both slides 85 and 86, then in locked connection by reason of trigger 101 engaging hook 100, to the left in Figure 8, until guide block 88 in the slots of slides 85 and 86 checks this movement at a point where the film 24 has been properly repositioned for the taking of another picture.

It will be noted that as the slides 85 and 86 shift to the left from the position shown in Figure 8 to the position shown in Figure 6, the shutter shifting arms 81 and 82 move the two sections of the shutter from the position shown in Figure 5 to the position shown in Figure 3, arm 81 pushing the shutter section consisting of the wings 44 and 45 from a spread position opposite the exposure opening to a full overlapped position at the left of the opening and arm 82 pulling the section consisting of the wings 46 and 47 from a full overlapped position at the right to a spread position across the exposure opening. This results by reason of the fact that through the before-mentioned gear connections, between the wings of each section and between the sections of the shutter and the stationary toothed plate 67, the wings of each section are forced to a differential movement during the sliding actuation, so that the exposure opening will be fully covered by the combined wings of one section of the shutter before and after an exposure has been made.

Figure 4:
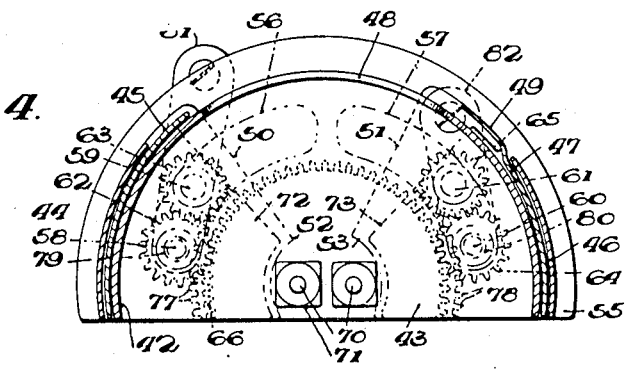

The set position of the parts resulting from the foregoing operation is illustrated in Figures 3 and 6 and it will be noted from the latter of these figures that the rounded nose 103 of trigger 101 is now seated in the side recess 114 of the release member 113. If then the finger piece 115 is pressed inwardly to shift release member 113, the latter tilts trigger 101 to the position shown in Figure 7, so as to release its hook 102 from the hook 100 of slide 86 and thus free this upper slide 86 which is then immediately drawn to the right by its spring 107. During this movement of slide 86, one section of the shutter consisting of the wings 46 and 47 is immediately shifted to the right from the position covering the exposure opening as shown in Figure 3 to the position uncovering said opening, as shown in Figure 4, thus permitting light to pass through the exposure opening and to impinge the objective upon the sensitized surface of film 24. In this way actuation of the initially movable section of the shutter during exposure is accomplished, but during this movement the bottom slide 85 is prevented from shifting under the tension of its spring 106 for a controlled interval.

Thus when trigger 101 was tilted during the above operation by the release member 113, its hook end was shifted laterally beyond one side of the slide 86 and into a position to engage one end 117 of an intermediately pivoted latch lever 118, along the opposite end of which extends one end 119 of a control lever 120 also intermediately pivoted and having its opposite end normally disposed in the path of movement of the slide 86.

Furthermore, in the first of the above releasing operations, the release member 113 in its initial inward movement to release slide 86 shifts disk 96 in a rotary direction to cause movement of its tongue 98 beneath the double gear 91, 92. The lifting of these gears releases the lower gear 91 from the rack 90 of slide 85. In this way the slide 85 is released for spring-actuated movement when slide 86 is released, except for the engagement of trigger 101 by the latch lever 118.

Thus when in its spring-actuated effective movement slide 86 shifts one section of the shutter, as previously described, and comes into contact with the free end of the control lever 120, the rocking of the latter on its pivot in turn rocks the latch lever 118 to shift the end 117 of the latter away and free of the trigger 101, so that the slide 85 is thus permitted to move to the right under actuation of its spring 106 so as to pull the shutter section consisting of the wings 44 and 45 from the full overlapped position shown in Figure 3 to the spread position shown in Figures 3 and 4 to the spread position shown in Figure 5 covering the exposure opening.

Obviously then, the two operations, that is, the movement of slide 86 to shift the shutter wings 46 and 47 clockwise to the position shown in Figure 4 and the movement of slide 85 to shift the shutter wings 44 and 45 in the same position, follow one another closely, the advancing edge of wing 45 defining between the same and the trailing edge of wing 47 a light admitting slot which is of the full height of the exposure opening and which is of a width depending upon the interval between the release of slides 86 and 85.

This time interval in turn obviously depends upon the relative position of the free end of control lever 120 with respect to the spring-actuated stroke of slide 86, while the speed of movement of both sections of the shutter and the duration of the light between the two sections of the shutter onto the film obviously depends upon the speed of movement of both sections, and this speed of movement in turn depends upon the effective strength of the springs 106 and 107.

For the above reasons, the control lever 120 is pivoted on a pin 121 which pivotally supports the head block 111, this pivot pin being carried by one end of the adjusting frame 112 before mentioned. This adjusting frame has sliding movement in the base 13 forwardly of the slides 85 and 86 and is provided with an upstanding toothed rack 122 which is engaged by a toothed wheel 123. Wheel 123 is secured upon a vertical shaft 124, at the upper end of which is a knurled adjusting wheel 125, a portion of the periphery of which is exposed at the front of the camera through a recess in the front wall of the base indicated at 126, the base having a second recess 127 through which, below the knurled wheel 125, the front surface of that portion of the adjusting frame 112 carrying the rack 122 is exposed to view as seen in Figure 1, in order that the operator may see marks indicating the different speeds and exposure times.

The shaft 124 serves to pivot the latch lever 118, one end of the latter of which is engaged by a controlling spring 128, and for this purpose the shaft upstands from the base 13 through a lengthwise slot 129 of the adjusting frame 112, so that by rotating the knurled wheel 125 the frame 112 may be shifted longitudinally by reason of the coaction of the toothed wheel 123 with the rack 122. Thus the free end of the controlling lever 120 may be shifted and positioned for engagement by slide 86 at different points in the spring-actuated stroke of the latter, and thus also it may be positioned beyond the end of the stroke of the slide 86, so that the latter in its spring-actuated effective stroke will not actuate the controlling lever 120 to in turn release the latch lever 118. Bear in mind that the frame 112 and the controlling lever are shiftable relative to the latch lever 118, the latter of which is not adjustable.

Thus for all instantaneous pictures, adjusting of frame 112 toward the left in Figures 6, 7 and 8 gradually decreases the time interval between the release of slides 86 and 85 and thus between effective movements of the two sections of the shutter. At the same time, each adjustment is made to thus gradually diminish the width of the exposure aperture between the two sections of the shutter, adjustment of the frame 112 toward the left gradually increases the tensions of springs 106 and 107 through the straps 108 and 109, so that, as the exposure aperture between the shutter sections is diminished or increased as the adjusting frame 112 is adjusted to the left or the right, the speed of movement of the two shutter sections is correspondingly increased and decreased so that both controls are taken care of at one and the same time and by one and the same adjustment, namely, adjustment by the knurled wheel 125.

Assuming that the adjusting frame 112 has been shifted to the right so that the free end of controlling lever 120 is beyond the effective stroke of slide 86, it is obvious the parts will be retained in the position shown in Figures 4 and 7, as long as the release member 113 is held in its inwardly pressed position. The reason is that since the controlling lever 120 is not actuated by the slide 86, the latch lever 118 will remain in position to engage the tilted trigger 101 and prevent shifting of slide 85 as long as this trigger is held in the tilted position of Figure 7. In this way, provision may be made for timed exposures where the exposure opening is to remain uncovered for a predetermined interval with the parts in the position shown in Figures 4 and 7. Upon release of member 13 by the operator, however, and return of this release member under tension of spring 97 to its normal position shown in Figures 6 and 8, trigger 101 resumes its normal position under tension of its spring 104, carrying its hooked end 102 away from and free of the end 117 of the latch member 118 to thus permit slide 85 to shift lengthwise under tension of its spring 107 and move the shutter wings 44 and 45 across the exposure opening.

It will, furthermore, be noted that, as effective movements of the shutter sections during each exposure or picture taking operation are controlled by slides movable in straight lines and as these slides are connected to the shutter sections by means of links or pivoted arms swingable to translate the movements of the slides into the arcs of sliding, swinging movements of the shutter sections, the invention effectively overcomes any tendency to acceleration of shutter movement and thus avoids the disadvantages arising from unequal or uneven light distribution across the face of the film.

What is claimed is:

1. In a miniature camera having an exposure aperture, a focal plane shutter in two sections, means for successively releasing said sections for timed movement in the same direction whereby to create an exposure slot between them, each section including differentially shiftable rigid overlapping wings, and connections between said wings whereby each section increases in width during its movement in one direction to an expanded position completely masking the exposure aperture and decreases in width during its movement in the other direction to a contracted position beyond one side of the exposure opening.

2. A focal plane shutter for a miniature camera having an exposure opening and limited spaces at opposite sides of said opening, said shutter comprising two sections successively movable to form an exposure slot therebetween, each section including rigid overlapping parts and connections for shifting said parts relative to one another to increase the widths of the sections during movement thereof in one direction to an expanded position across the exposure opening and decrease the widths thereof during movement in the opposite direction to a contracted position within one of said spaces.

3. A focal plane shutter for a miniature camera having restricted spaces at opposite sides of its exposure opening, said shutter comprising two successively movable sections forming an exposure slot therebetween, each section including a pair of rigid overlapping wings, and connections effective during each operative movement of the shutter for causing differential movement of said wings of one section to a retracted position in one of said spaces, and for moving the wings of the other section to an expanded position across the exposure opening.

4. A focal plane shutter for a miniature camera having an exposure opening, said shutter comprising two sections swingable in a substantially semi-circular path, means for swinging said sections in timed relation to form an exposure slot therebetween, each of said sections consisting of a pair of curved overlapping rigid wings, and geared connections between the wings of each section for causing a shifting movement relative to one another during swinging movement of the said sections to an expanded position covering the exposure opening and a retracted position in a constricted space beyond one side of the said opening.

5. A focal plane shutter for a miniature camera having an exposure opening and restricted spaces at opposite sides of said opening, said shutter comprising two curved swingable sections forming an exposure slot between them, each embodying a pair of rigid, relatively shiftable curved wings permitting expansion and contraction of the wings and connections for causing differential movements of said wings during swinging thereof between an expanded position opposite the exposure opening and a contracted position in one of said spaces, actuating means for the said shutter sections including independently shiftable slide members, and means releasable in timed relation upon movement of one of said slide members for releasing the other of said slide members.

6. A focal plane shutter for a miniature camera having an exposure aperture, said shutter comprising a pair of swingable, expansible and contractible sections forming an exposure space therebetween and each including rigid, overlapping relatively shiftable parts, means for causing differential movements of said shutter parts of each section during swinging movements of said sections between an expanded position opposite the exposure opening and a contracted position within a restricted space at one side of said opening, and an actuating mechanism therefor including independently movable slide members, each connected to its respective section of the shutter, adjustable means for releasing, in timed relation, one of said slide members by the movement of the other slide member, and spring means for actuating both slide members under a tension controlled by the said releasing means.

7. A focal plane shutter for a miniature camera having an exposure aperture, said shutter comprising a pair of swingable, expansible and contractible sections forming an exposure space therebetween and each including rigid, overlapping relatively shiftable parts, means for causing differential movements of said shutter parts of each section during swinging movements of said sections between an expanded position opposite the exposure opening and a contracted position within a restricted space at one side of said opening, means for actuating said sections in timed relation to control the space therebetween including a pair of slide members, spring means for moving said slide members, manually controlled means for releasing one of said slide members for movement, connections actuated by the released slide member during its movement for releasing the other slide member for movement, and adjustable means simultaneously controlling the time of release of the second slide member and the effective tensions of the springs actuating both slide members.

8. A focal plane shutter for a miniature camera having an exposure aperture, said shutter comprising a pair of swingable, expansible and contractible sections forming an exposure space therebetween and each including rigid, overlapping relatively shiftable parts, means for causing differential movements of said shutter parts of each section during swinging movements of said sections between an expanded position opposite the exposure opening and a contracted position within a restricted space at one side of said opening, a pair of initially locked slide members connected to said shutter sections for shifting the latter, springs for moving the slide members, an adjusting member movable to control the effective tensions of said springs, manually controlled means for releasing one of said slide members, and means for automatically releasing the other of said slide members during movement of the first slide member.

9. A focal plane shutter for a miniature camera having an exposure aperture, said shutter comprising a pair of swingable, expansible and contractible sections forming an exposure space therebetween and each including rigid, overlapping relatively shiftable parts, means for causing differential movements of said shutter parts of each section during swinging movements of said sections between an expanded position opposite the exposure opening and a contracted position within a restricted space at one side of said opening, a pair of initially locked slide members connected to said shutter sections for shifting the latter, springs for moving the slide members, an adjusting member movable to control the effective tensions of said springs, manually controlled means for releasing one of said slide members, and means for automatically releasing the other of said slide members during movement of the first slide member, said last named means including a controlling element carried by, and adjustable with, the said manually adjusted spring controlling member.

10. A focal plane shutter for a miniature camera having an exposure aperture, said shutter comprising a pair of swingable, expansible and contractible sections forming an exposure space therebetween and each including rigid, overlapping relatively shiftable parts, means for causing differential movements of said shutter parts of each section during swinging movements of said sections between an expanded position opposite the exposure opening and a contracted position within a restricted space at one side of said opening, a pair of slide members independently connected to said sections, manually actuated means for moving said slide members in unison in one direction, manually actuated means for releasing one of said slides for movement, springs for shifting said slides in the opposite direction upon release, means actuated during movement of one slide for automatically releasing the other slide, and means for simultaneously adjusting the last mentioned slide releasing means and the effective tension of the actuating springs, including a single manually adjustable element.

11. A focal plane shutter for a miniature camera having an exposure aperture, said shutter comprising a pair of swingable, expansible and contractible sections forming an exposure space therebetween and each including rigid, overlapping relatively shiftable parts, means for causing differential movements of said shutter parts of each section during swinging movements of said sections between an expanded position opposite the exposure opening and a contracted position within a restricted space at one side of said opening, a pair of slide members independently connected to said sections for actuating the latter, manually actuated means for shifting said slide members in unison in one direction, spring means for independently shifting the slide members in the opposite direction, means for releasing one of said slide members for movement under tension of its spring and simultaneously releasing the manually actuated shifting means out of connection with the slide members, and means for automatically releasing the other of said sliding members during spring actuated movement of the first slide member.

12. A focal plane shutter for a miniature camera having an exposure aperture, said shutter comprising a pair of swingable, expansible and contractible sections forming an exposure space therebetween and each including rigid, overlapping relatively shiftable parts, means for causing differential movements of said shutter parts of each section during swinging movements of said sections between an expanded position opposite the exposure opening and a contracted position within a restricted space at one side of said opening, a pair of slide members independently connected to said shutter sections for moving the same, manually actuated means for moving said slide members in unison in one direction, springs for independently shifting the slide members in the opposite direction, manually controlled means for releasing one of said slide members for spring actuated movement, and simultaneously disengaging the said manually moving means from the slide members, a latch member effective upon release of the first slide member to check movement of the second slide member, and a controlling member having a portion disposed in the path of movement of the released slide member for disengaging the latch with respect to the second slide member.

13. A focal plane shutter for a miniature camera having an exposure aperture, said shutter comprising a pair of swingable, expansible and contractible sections forming an exposure space therebetween and each including rigid, overlapping relatively shiftable parts, means for causing differential movements of said shutter parts of each section during swinging movements of said sections between an expanded position opposite the exposure opening and a contracted position within a restricted space at one side of said opening, a pair of slide members independently connected to said shutter sections for moving the same, manually actuated means for moving said slide members in unison in one direction, springs for independently shifting the slide members in the opposite direction, manually controlled means for releasing one of said slide members for spring actuated movement, and simultaneously disengaging the said manually moving means from the slide members, a latch member effective upon release of the first slide member to check movement of the second slide member, a controlling member having a portion disposed in the path of movement of the released slide member for disengaging the latch with respect to the second slide member, and a manually adjustable support for said controlling member for adjusting the latter along the path of movement of the first slide member to adjustably control the time interval between the release of the two slide members.

14. In a miniature camera having an exposure opening, a focal plane shutter comprising two sections expansible and contractible in the direction of their movements across the said exposure opening, each section consisting of overlapping rigid members which when contracted are positionable in restricted spaces at the sides of the exposure opening and when expanded are positionable to completely mask the exposure opening, means to successively move said shutter sections in timed relation to form therebetween an exposure space, and means for expanding one and contracting the other of said sections during each effective movement thereof and to equalize said expansion and contraction of the two sections whereby to maintain the exposure space of constant dimension for the full length of the exposure opening, during each effective movement of the shutter sections.

LAWRENCE W. CAREY.